May 15, 1934.  D. G. McCAA  1,959,275
METHOD OF AND APPARATUS FOR CONTROLLING ALTERNATING CURRENTS
Original Filed Dec. 8, 1925
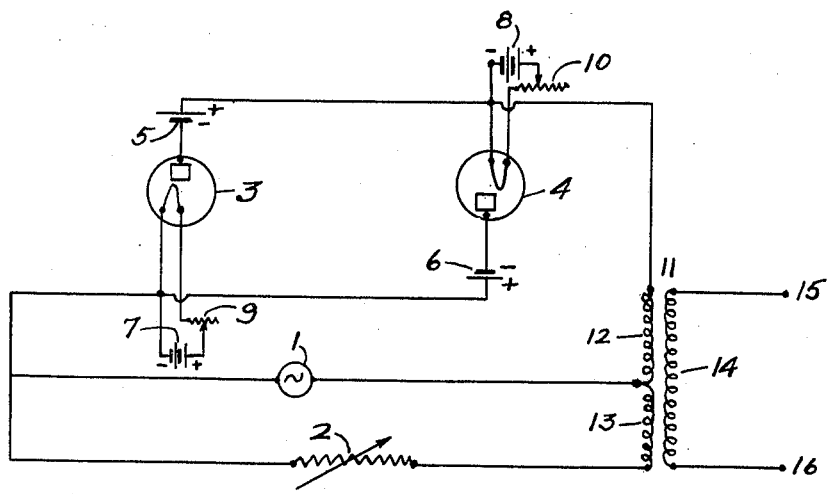
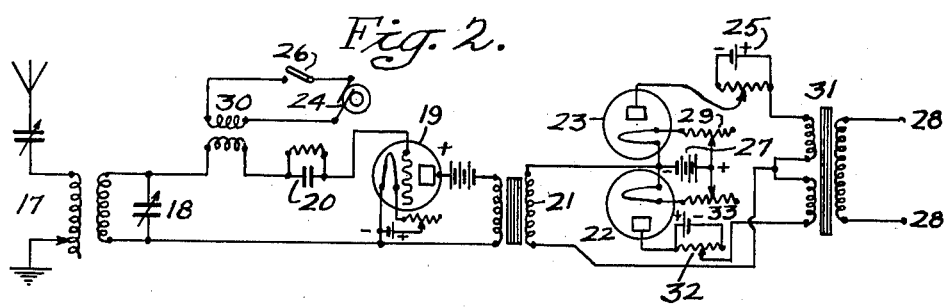
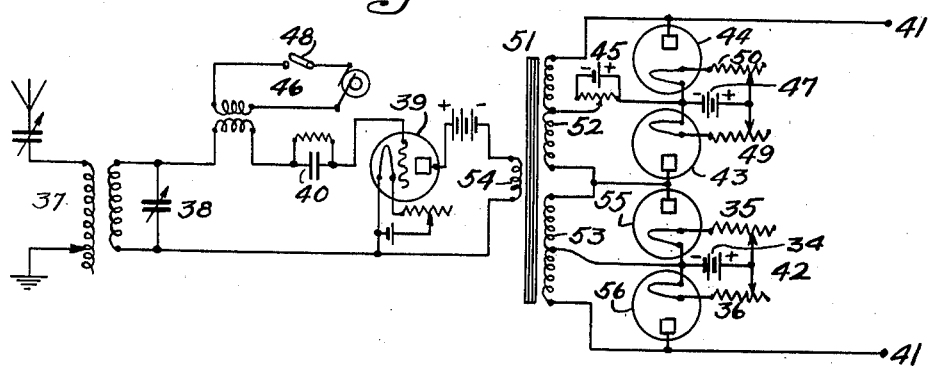
Inventor –
David G McCaa,
by his Attorneys,
Howson & Howson Patented May 15, 1934

1,959,275

UNITED STATES PATENT OFFICE 1,959,275

METHOD OF AND APPARATUS FOR CONTROLLING ALTERNATING CURRENTS

David G. McCaa, Lancaster, Pa.

Original application December 8, 1925, Serial No. 74,087, now Patent No. 1,814,051, dated July 14, 1931. Divided and this application November 21, 1928, Serial No. 320,849

4 Claims. (Cl. 250—20)

This application is a division of application filed December 8, 1925, Serial Number 74,087.

The object of this invention is to provide a novel and improved method and device for differentiating in electrical circuits between impulses of electrical energy of different amplitudes, the higher amplitude wave being damped, as for example atmospheric static or other similar electrical disturbances.

In the attached drawing:

Figure 1 represents the electrical wiring diagram of a device for discriminating between impulses of high amplitude and waves of low amplitude, utilizing the method of my invention, and Figs. 2 and 3 represent radio receiving devices to which my method of discriminating between high amplitude impulses and low amplitude waves is appiled in order to reduce the effect of interference due to atmospheric static and other undesired impulses.

In Fig. 1, 1 represents a source of electrical waves and impulses; 2 represents a variable resistor; 3 and 4 are asymmetric conductors which in this figure are thermionic two-element valves; 5 and 6 are polarizing batteries each associated with an element of the thermionic valves 3 and 4; 7 and 8 are batteries which are adapted to energize the filaments of the valves 3 and 4; 9 and 10 are rheostats which regulate the current supplied from the batteries 7 and 8 to the filaments of the valves 3 and 4; and 11 is a transformer comprising windings 12, 13 and 14, the ends of the winding 14 being associated with terminals 15 and 16. It will be noted that batteries 5 and 6 are so connected as to prevent the flow of current in valves 3 and 4 unless the potential across either valve increases to a value greater than the potential of its associated polarizing battery.

For purposes of description, it may be assumed that batteries 5 and 6 have a direct current potential of six volts. It may also be assumed that the source of electrical energy 1 is supplying at least two separate and distinct electrical waves which may be of any frequency, at least one of the electrical waves being in the form of impulses having a peak potential greater than six volts and another a wave having a peak potential of less than six volts. Although the electrical waves when combined present a single wave having the characteristics of a combination of the original waves, for purposes of illustration the waves may be considered separately. Upon consideration of the wave of lower amplitude, that is, the wave of less than six volts peak potential, it will be seen that valves 3 and 4 will present high resistance to this wave, thus effectually causing the energy due to this wave to flow in the circuit 1, 2, 13. The alternating current flowing through winding 13 of transformer 11 will induce corresponding voltages in windings 12 and 14. Winding 12 being connected only to the high impedance valves 3 and 4 will be effectively open circuited. The voltage generated in winding 14 may be applied across terminals 15 and 16 and will represent the original low intensity wave as it came from source 1. A consideration of the high intensity impulse wave generated at source 1 will show that as the voltage of the wave increases to more than six volts, the valves 3 and 4 commence to carry current in accordance with the amount of voltage exceeding six volts, the valve 3 carrying the current in one direction and the valve 4 carrying current in the other direction.

It will also be seen that the lower voltage portions of the high amplitude impulse waves will flow in circuit 2, 13, and will not flow through the valves 3 and 4 or the winding 12. It thus becomes apparent that the low voltage portion of the high amplitude impulse wave traverses only winding 13 of transformer 11, whereas the high voltage portion of the same impulse wave generates opposite potentials in windings 12 and 13. As the voltage of the electric impulse wave increases from zero to six volts, a corresponding voltage appears at terminals 15 and 16. As the voltage increases beyond six volts, the corresponding voltage would appear at terminals 15 and 16, except that valves 3 and 4 are now in conductive condition and allow opposing voltages to appear across winding 12. These opposing voltages reduce the intensity of the voltage across terminals 15 and 16 so that the high voltage portion of the high amplitude impulse is reduced.

It will be noted upon consideration that the circuit including source 1, winding 12, and valves 3 and 4 presents a certain different average resistance to each voltage in excess of the voltage of batteries 5 and 6. By adjusting the resistance 2 to equal approximately the average resistance of the valve circuit to the high voltage portion of the high amplitude impulse wave, an approximate balance between the voltages generated by the high voltage portion of the high amplitude impulse wave in windings 12 and 13 is obtained.

This will be apparent upon consideration of the device as a Wheatstone bridge, the elements of which are the winding 12, a winding 13, resistance 2, and the valve circuit. For a certain input voltage at source 1, an approximate balance may be obtained, depending on the ratio of turns between windings 12 and 13, and upon the average resistances of resistor 2 and of the valve circuit, so as to eliminate substantially all output for that input voltage. Upon further consideration, it will also be seen that terminals 15 and 16 and source 1 may be interchangeably used as the input and output terminals of the system.

For purposes of illustration, the waves of high and low intensity have been considered separately. In actual practice, the waves will in most cases be combined to form a complex wave of form and amplitude corresponding to the original waves. In this complex wave, it will be seen that when the wave of low amplitude and the impulse wave of high amplitude are both for instance near their maximum positive values, the amplitude of the complex wave will be high and will take the form of a lower frequency wave modulated by a higher frequency wave. It is, of course, apparent that if the maximum wave potential were limited to a fixed value, the modulation on the low frequency wave would be attenuated to a very low value. However, in this system as the balance does not occur until the amplitude is very high, the portions of moderate intensity of the high amplitude impulse wave being attenuated more and more proportionately as the amplitude increases, it will be seen that the higher frequency wave within the predetermined limits will be transferred to the output terminals, although to a diminishing extent. If this gradual change of attenuation were not inherent in the system, there would be times when the signal desired would be balanced out with and because of the higher wave impulse. However, by allowing a reduced transfer of the high intensity impulse wave, the low intensity wave is never completely balanced out. It is apparent that there will be a certain distortion of amplitude of the signal because of this action. However, with this device, the low amplitude signal will be successfully received with only minor distortion, whereas without the device, the high amplitude impulse wave might predominate to such an extent that reception of the low amplitude signal would be practically impossible.

Fig. 2 illustrates a combination of a device of Fig. 1 with a collector and detector for radio signals. 17 is a tuned antenna system or collector of radio waves. 18 is a tuned circuit associated with the antenna system. 19 is a vacuum tube arranged in this circuit to act as a detector with the grid condenser and leak system 20. Signals from the detector are transferred through transformer 21 into a device similar in principle to the device of Fig. 1. The system illustrated differs from the device of Fig. 1 in that a thermionic resistor 22 provided with a small adjustable positive bias is used instead of the resistor 2 of Fig. 1. The similarity of this device with the device of Fig. 1 will be seen upon consideration of the various elements. The transformer 21 corresponds to the source of waves 1 and thermionic resistor 22 with its associated bias system 32 corresponds as stated above to resistor 2; and valve 23 and bias device 25 corresponds to valve 3 and battery 5. Battery 27 corresponds to battery 7, and it will be noted also provides energy for the filament of resistor 22. Rheostats 29 and 33 regulate current in the ordinary manner, and transformer 31 is arranged to combine the effects of the valve and resistor circuits in a manner similar to the transformer 11 of the first figure. The output of transformer 31 may be obtained from termials 28, 28. Transformer 30 with oscillator 24 and switch 26 are associated with the circuit in the ordinary manner so that a heterodyne beat may be obtained for any suitable purpose.

Let it be assumed that a negative potential of two volts is maintained from the plate to the filament of the valve 23 by biasing source 25. If the bias 22 is reduced to zero, impulses which cause the filament to become not more than two volts negative with respect to the anode of resistor 22 will pass in resistor 22 by not in valve 23. Impulses reaching more than two volts potential will cause opposing currents to flow in the resistor and in the valve circuits, thus providing a balanced action in the transformer 31. Impulses which cause a positive potential from the filament to the plate of the resistor 22 will not flow in either circuit. The device when so arranged accordingly operates on one-half the wave only.

If full wave action is desired, biasing source 32 is adjusted until the voltage across the thermionic device 22 is the same as the voltage across the device 23 but of opposite polarity. Under these circumstances, impulses of less than two volts will cause current to flow only through the device 22, whereas impulses exceeding two volts positive will cause current to flow in the circuits of both devices with a substantial balancing effect. Impulses of more than two volts negative can cause current to flow in neither circuit.

In Fig. 3, 37, 38, 39 and 40 illustrate elements similar to those shown in Fig. 2 comprising a system for receiving and detecting a radio signal. Transformer 51 with windings 52, 53 and 54 transfers the incoming signal from the detecting circuit to the valve system. Winding 52 is associated with the system including valves 43 and 44 which are provided with filament energy from battery 47, the amount of which is regulated by rheostats 49 and 50. These valves are also provided with a common source of bias 45 for maintaining the plates at a constant negative potential with respect to the filaments. Resistor system 42 which is associated with transformer winding 53 consists of a pair of thermionic resistors 55 and 56 which are provided with filament energy from source 34 which is regulated by rheostats 35 and 36. The device including the valves 43 and 44 and resistor 42 is provided with a pair of output terminals 41, 41. There is also associated with this system a heterodyne system 46 with an actuating switch 48. It will be noted that the system following transformer 51 corresponds with the system of Fig. 1 using the transformer 51 as an input device in the same manner that transformer 11 could be used to input signals to the device of Fig. 1. The arrangement of thermionic elements is such that a minimum number of sources of direct current energy is needed. The action of this device is similar to the action of the device of Fig. 1, in that incoming waves will generate opposing potentials in windings 52 and 53, the potential generated in winding 53 being largely dissipated in resistor system 42, allowing the voltage generated in winding 52 to appear at terminals 41, 41 only slightly attenuated. An impulse of high amplitude which is for instance of sufficient voltage to flow through valves 43 and 44 overcoming the potential of bias source 45 will appear at terminals 41, 41 in greatly attenuated form, as the loads on the windings 52 and 53 being practically equal, the opposing voltages are also practically equal.

The manipulation of the systems illustrated in Figs. 2 and 3 is the same and will be described in terms of the elements used. For example, a signal of moderate intensity is received in the aerial system and transferred to the tuned input circuit of the detector system. Static and other interfering impulses will be simultaneously received at this same point. Impulses of static interference do not become very noticeable until the amplitude of the static impulses is considerably greater than the amplitude of the signal waves. In other words, static of no greater amplitude than the maximum signal is noted by the operator as a background noise rather than as an impulse which may be identified. The value of the bias in the valve system 25 or 45 is set to a value greatly in excess of the desired signal. The value of resistor 22 or 42 is set to any convenient figure allowing the complete signal with its accompanying interference to appear at the output terminals. The adjustment of the valve bias is now made by changing it until the ear detects a slight reduction of signal strength, from which adjustment the potential may be increased slightly to cause the plate to be slightly more negative. The resistance value of the resistor is then adjusted to approximately balance the bridge for impulses due to static and other interfering impulses. It will thus be seen that the desired signal with interfering impulses of a lower intensity than the maximum of the signal will be received at the output terminals, and that impulses of higher amplitude such as static and spark interference will be practically balanced out in the bridge system.

However, it is to be noted that signals slightly in excess of the amplitude at which the bias is set will not be completely balanced out, the balance only occurring at a point greatly in excess of the maximum of the signal. This provision makes the system applicable for use with radiophone signals and fading and other signals which vary largely in intensity from time to time, as the attenuation of the maximum peak of the signal when in excess of the bias potential is only very slight and not enough to cause apparent amplitude distortion. However, the crashes and clicks from interfering sources will be so diminished as to become almost inaudible and will appear only as a slight background noise.

While one application of this device to simple radio systems has been described, it is apparent that it may be associated with more complex radio systems or with other signal systems of various types, or for instance to eliminate surges in power systems. It may also be used if convenient to discriminate between waves of low and high intensity either or both of which may be desired for suitable purpose.

I claim:

1. In a system comprising a source of alternating currents of different amplitudes, a diode vacuum tube, a source of uni-directional electromotive force of magnitude comparable to the magnitude of current of lesser magnitude, and a translating device, the method of differentiating between said alternating currents which comprises dividing said currents into components, passing one of the components of each of said currents through said diode vacuum tube to select half-wave components of a predetermined sign, opposing said uni-directional electro-motive force to the component of the current of lesser amplitude passed through the said diode vacuum tube, and causing said components of the current of greater amplitude to oppose each other in their effect upon said translating device.

2. The combination with a source of alternating currents of different amplitudes, of diode vacuum tube in circuit with said source for deriving half waves therefrom, a source of uni-directional electro-motive force of magnitude comparable to the magnitude of one of said currents of lesser amplitude connected in such sense with said diode vacuum tube as to oppose conduction therethrough of half waves of one sign of said current of lesser amplitude, means for deriving waves of all amplitudes from said source without discrimination, and means for combining said derived waves in opposed relation with said half waves.

3. In a radio receiving system in which occur radio frequency currents of different amplitudes representing, respectively, the desired signal and interfering energy, the combination with means producing audiofrequency currents representing said currents, of a signal translating instrument, means dividing said audiofrequency currents into components, means causing said components to oppose each other in their effect upon said signal translating instrument, asymmetric conductors through which said components simultaneously pass, and a source of uni-directional electromotive force connected to oppose the passage through one of said asymmetric conductors of the component of the audiofrequency current of lesser amplitude to cause an effect upon said signal translating instrument.

4. In a radio receiving system in which occur radio frequency currents of different amplitudes representing, respectively, the desired signal and interfering energy, the combination with means producing audiofrequency currents representing said currents, of a signal translating instrument, means dividing said audiofrequency currents into components, means causing said components to oppose each other in their effect upon said signal translating instrument, asymmetric conductors through which said components simultaneously pass, a source of uni-directional electro-motive force connected to oppose the passage through one of said asymmetric conductors of the component of the audiofrequency current of lesser amplitude to cause an effect upon said signal translating instrument, and a source of uni-directional electro-motive force connected to assist the other component of said current of lesser magnitude passed through another of said asymmetric conductors to increase the effect upon said signal translating instrument.

DAVID G. McCAA.